May 19, 1970  C. H. GRAHAM  3,512,808
FLUID COUPLING ASSEMBLY
Filed Aug. 4, 1967  2 Sheets-Sheet 1
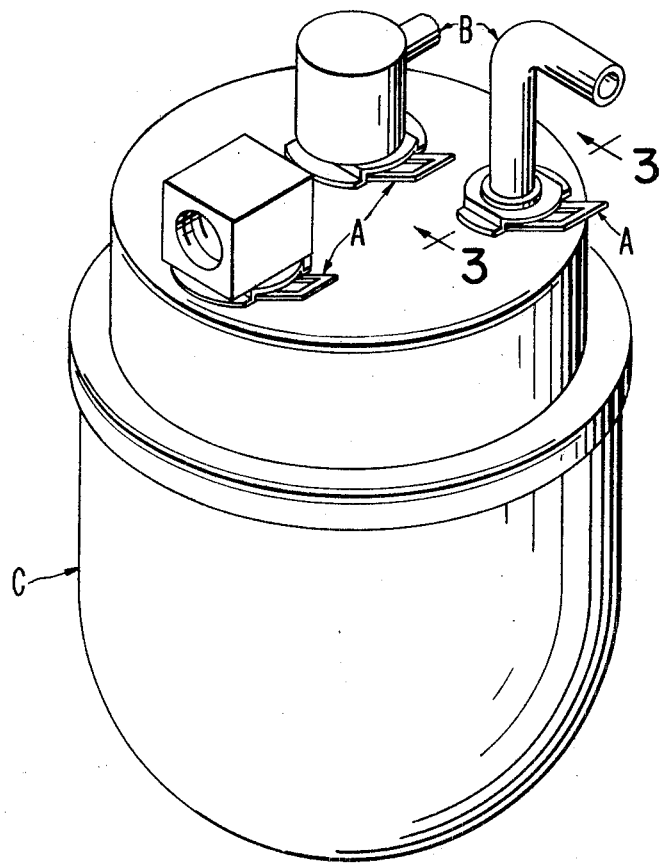
FIG.1
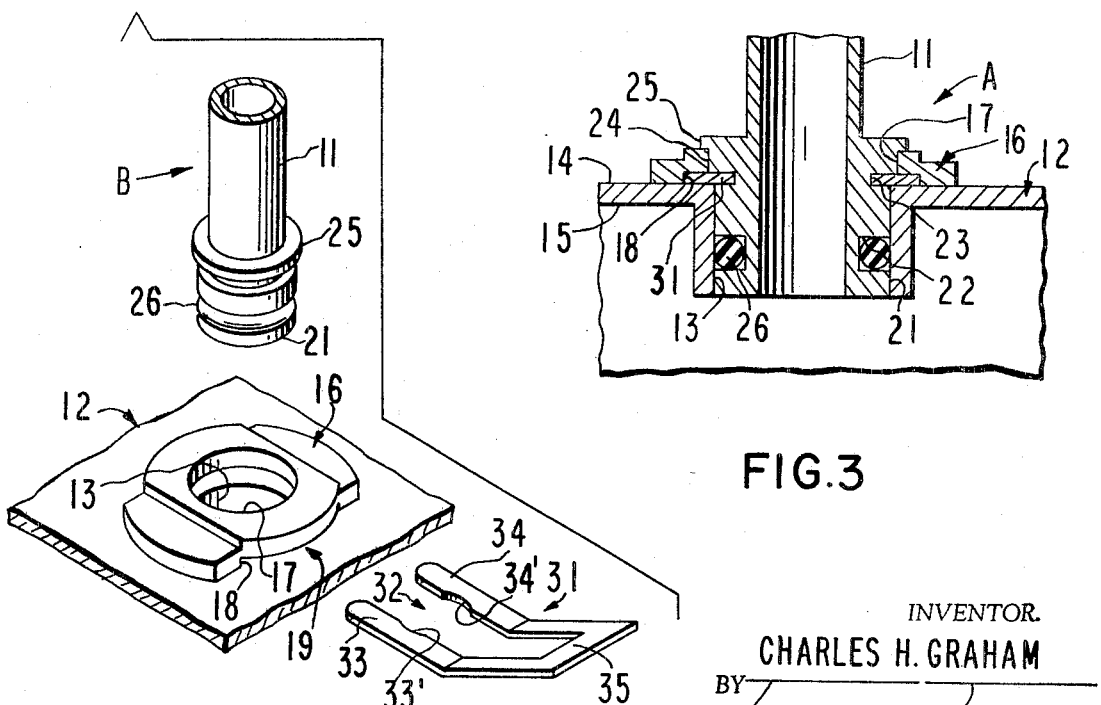
FIG.2
FIG.3
INVENTOR.
CHARLES H. GRAHAM
BY
Townsend and Townsend
ATTORNEYS May 19, 1970   C. H. GRAHAM   3,512,808
FLUID COUPLING ASSEMBLY
Filed Aug. 4, 1967   2 Sheets-Sheet 2
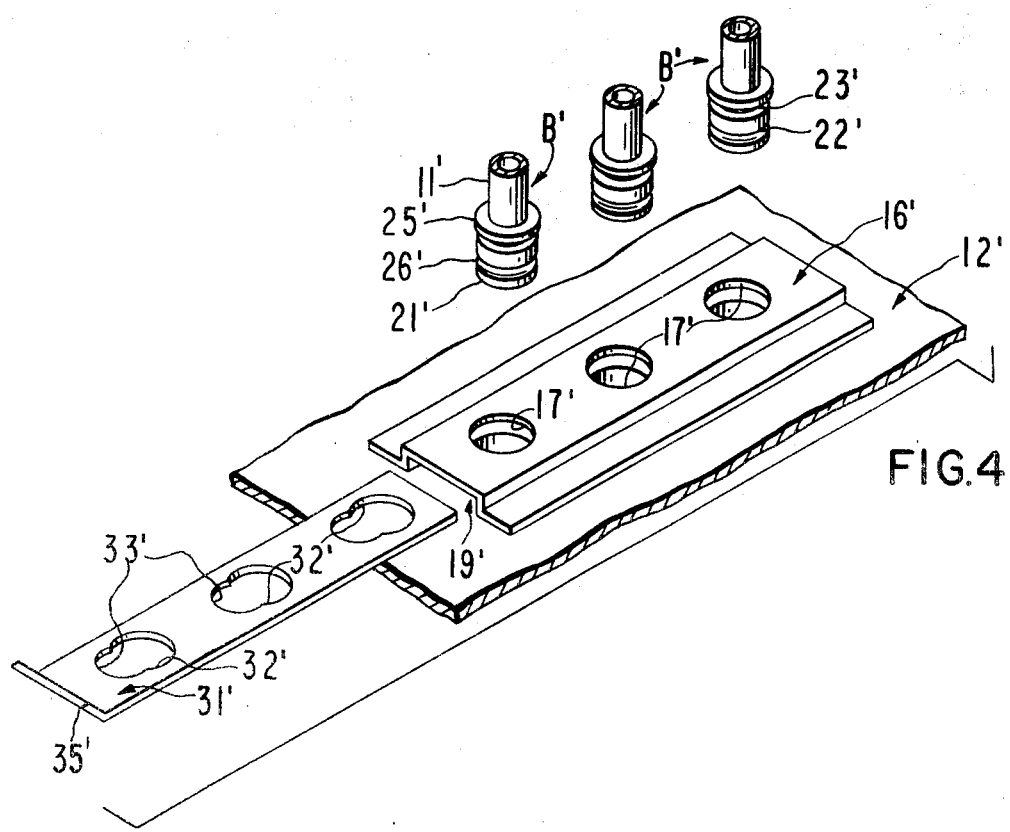
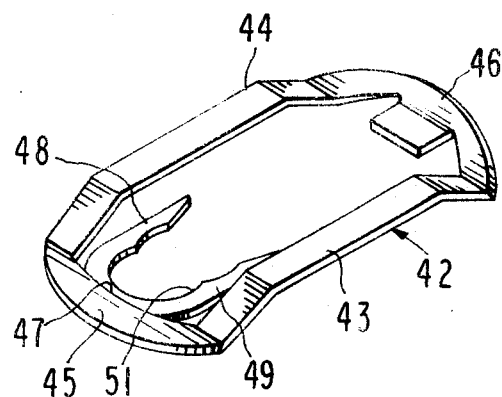
INVENTOR.
CHARLES H. GRAHAM
BY Townsend and Townsend
ATTORNEYS United States Patent Office 3,512,808
Patented May 19, 1970

3,512,808
FLUID COUPLING ASSEMBLY
Charles H. Graham, Mountain View, Calif., assignor to Gra-Tec, Inc., Los Altos, Calif.
Filed Aug. 4, 1967, Ser. No. 658,405
Int. Cl. F16l 41/00
U.S. Cl. 285—189    5 Claims

ABSTRACT OF THE DISCLOSURE

A fluid coupling assembly and method of making same from a female member and an end of a tubular male member having a pair of annular grooves spaced apart axially between a shoulder stop and the end wherein the male and female members have slidably mating enlarged diameter portions juxtaposed the edge of the groove nearest the shoulder stop when in assembled position. The female member can be formed by punching a hole at an obverse wall surface and securing a channel defining plate on the obverse wall surface over the hole.

---

The present invention is directed to a coupling assembly and, more particularly, to a fluid coupling assembly for providing an easily assemblable connection to an existing fluid handling assembly.

This invention is an improvement on my coupling assembly system described in pending application Ser. No. 617,145 filed Feb. 20, 1967, and entitled, "Coupling Assembly," and this application is a continuation-in-part of such application Ser. No. 617,145 and of applications Ser. Nos. 432,598 filed Feb. 15, 1965, and 515,848, filed Dec. 23, 1965, now abandoned. The invention described in that previous application is directed to a coupling assembly system made up of fitting terminations and distribution blocks provided with a plurality of intersecting smooth bores for receiving the fitting terminations so that terminations can be assembled with bores to provide any one of a multitude of possible fitting configurations, sizes and mating characteristics by selection of certain parts as desired.

Broadly stated the invention of the present application is directed to a coupling assembly wherein a seal is made between a fitting termination and an existing part in a manner similar to the seal created between the fitting termination and distribution blocks in the aforementioned application. Utilizing a plate member secured to the part over a hole which is punched into the part a fitting termination can be affixed to and provided in sealed communication with the interior portion of the part.

The construction in accordance with the present invention enables connection directly to existing parts with a minimum amount of modification and adapts these existing parts for ready connection to systems incorporating applicant's coupling system. Additionally, this construction avoids the use of costly brazed joints typically utilized to provide stem connections to flat surfaced body members and permits a minimum number of parts for providing connection of various fluid handling members or conduits to a particular housing or body member.

Other features and advantages of the present invention include the ability to easily and efficiently change the termination fittings connected to a particular body member and avoids the problems of possible cross-threading resulting where threaded couplings are required.

In accordance with one embodiment of the present invention, the plate secured to the housing or existing part is provided with a pair of shoulders projecting therefrom at equal distances from the aperture therethrough in the same direction out of the plane of the portion of the plate defining the aperture thereby to define a channel between the shoulders to receive the retaining member for locking the fitting termination to the housing or preexisting part.

One of the features and advantages of this aspect of the present invention is the accurately and yet inexpensively provided channel for reception of the retaining member or clip for locking the termination to the preexisting part.

Another feature and advantage of this aspect of the present invention is the manner in which the plate member can easily be secured to the preexisting part such as by spot welding.

Still another feature and advantage of this aspect of the present invention is the ability to easily position the orientation of the slot or channel with respect to the preexisting part before the plate member is secured to the part so that the retaining clip or member can be inserted into the coupling assembly from one of the two ends of the channel and these ends positioned to avoid obstructions.

Still another aspect of the present invention is the provision of a coupling assembly of the type described above wherein the diameter of the aperture in the plate is greater than the diameter of the cylindrical bore in the preexisting part and provision on the fitting termination for a shoulder at the edge of the outermost groove having a diameter greater than the diameter of the cylindrical bore but less than the diameter of the plate aperture.

In accordance with this aspect of the present invention the surface and edges of the aperture and plate member are spaced outwardly from the sealing member or O-ring as a fitting termination is inserted into the coupling assembly thereby avoiding damage such as by cuts to the surface of the sealing member while at the same time providing the shoulder closely slidable within the aperture to prevent excessive wobbling motion of the fitting termination when positioned in the coupling assembly that would permit leakage of the fluid past the seal between the fitting termination and the preexisting part.

In accordance with another aspect of the present invention, a retainer clip is provided for use with a stepped shoulder annular ring wherein sides of the clip ride above the shoulders on one side of the annular ring and retaining legs extend into the channel defined by the shoulders on the other side of the annular ring. A retainer clip constructed in this manner can be retained on the coupling assembly when the coupling assembly is opened for removal of the fitting termination. This allows convenient removal and avoids the possibility of loss of the retaining clip.

Other objects, features and advantages of the present invention will become apparent upon reading the following specification and referring to the accompanying drawings in which similar characteristics of reference represent corresponding parts in each of the several views.

In the drawings:

FIG. 1 is a perspective view of a fuel pump to which the present invention has been applied;

FIG. 2 is an exploded perspective view of one portion of the structure in FIG. 1 illustrating the present invention;

FIG. 3 is an enlarged cross-sectional view of a portion of the structure shown in FIG. 1 taken along line 3—3 in the direction of the arrows;

FIG. 4 is an enlarged perspective view of another embodiment of the present invention; and FIG. 5 is a perspective view illustrating a retaining clip in accordance with another aspect of this invention.

Referring now to the drawing, there is shown in FIG. 1 several coupling assemblies A constructed in accordance with the present invention for providing sealed fluid communication between a fluid carrying member or fitting termination B and a housing or preexisting part C such as a fuel pump used for illustrative purposes. While the present invention is applicable for providing fluid tight communication between two members of various configurations, the invention will be described in greater detail below with reference to a coupling assembly A wherein a conduit is connected to a preexisting part.

Referring now to FIGS. 2 and 3, there is shown a coupling assembly A wherein a conduit or male member 11 is connected in a fluidtight manner to a wall 12 of a preexisting part such as a fuel pump. The wall 12 is provided with a punched aperture 13 formed in a well known manner by a punch press to define a smooth cylindrical bore forming the female portion of the coupling assembly. This cylindrical bore punched aperture 13 extends from the obverse surface 14 of the wall 12 past the reverse surface 15 thereof providing sufficient axial length for creation of the seal and rigidity to the ultimately assembled male member 11.

A plate member 16 in the form of an annulus is secured such as by spot welding to the obverse surface of wall 12 coaxially with the punched aperture 13. In one embodiment of the present invention the inside diameter 17 of the annulus is larger than the diameter of the aperture 13. The plate 16 is provided with a pair of shoulders 18 projecting therefrom at equal distances from the aperture therethrough and the same direction out of the plane of the plate portion defining the annulus to define a channel 19 between the two shoulders for reception of a retaining member described in greater detail below.

The fitting termination B or conduit 11 is provided on its free end with a cylindrical surface 21 having first and second annular grooves 22 and 23 spaced apart axially thereof with the first groove closest the free end of the termination. On the side of the second groove opposite the first groove are first and second annular shoulders 24 and 25, and the diameter of the shoulders increases from the diameter of the cylindrical surface 21 in the direction away from the free end of cylindrical surface 21. The first shoulder 24 has a diameter larger than the diameter of the cylindrical surface 21 but slightly smaller than the inside diameter 17 of the annulus 16 for a sliding fit therein, and the second shoulder 25 has a diameter larger than the inside diameter 17 of the annulus 16 providing a stop against the plate 16 when the conduit 11 is inserted into the punched aperture 13.

A sealing member such as an O-ring 26 is positioned in the first annular groove for creating the fluidtight seal between conduit 11 and wall 12.

A bifurcated retaining clip 31 slidable within the channel 19 for engagement therein with the second annular groove 23 is provided with a generally U-shaped cutout 32 to provide facing leg portions 33 and 34 whose facing sides are provided with semicylindrical cutouts 33' and 34' for engaging the cylindrical bottom surface of the second annular groove 23 for releasably locking clip 31 in place thereby retaining the conduit 11 securely to the part wall 12. Since insertion of clip 31 requires a certain amount of spreading the clip leg portions, the overall distance between leg portions 33 and 34 in the regions other than the cutout regions 33' and 34' is less than the diameter of the bottom surface of the second annular groove 23. In order to facilitate spreading of the legs 33 and 34 these legs are bent part way along their length so that the connecting portion 35 there between lies in a plane which makes an angle with the plane containing the cutout portions of the legs. The greater the angle between these two planes, the less force is required to spread the clip legs during insertion into or removal from the channel 19.

The coupling assembly A is assembled by insertion of the cylindrical surface 21 of conduit 11 through the aperture in plate 16 into the punched aperture 13 of wall 12 until the second shoulder 25 on the fitting termination abuts the exterior surface of plate 16 around the aperture therethrough. Then the retaining clip 31 is slidably inserted into channel 19 until the legs 33 and 34 reach the second annular groove 23 which by reason of the spicing thereof from the second shoulder 25 is aligned with channel 19. Further insertion of the retaining clip 31 causes spreading of legs 33 and 34 until the cutout portions 33' and 34' thereof reach the bottom surface of the second annular groove 23. In this position, the fitting termination is supported and held within the part C with a fluid-tight seal provided by the two members of the coupling assembly A by the O-ring 26. Movement of the conduit 11 with respect to the wall 12 is prevented by shearing action on the clip 31.

In order to create a good seal in the coupling assembly the O-ring must naturally extend above the cylindrical surface 21 before the fitting termination is inserted into the punched aperture so that the O-ring is squeezed against both the walls of the punched aperture 13 and of the annular groove 22 to create the seal. In order not to cause damage to the sealing surface of the O-ring such as cutting and scraping when passing sharp edges the inside diameter 17 of the annulus 16 is provided larger than the diameter of the punched aperture 13. Additionally, the first shoulder is provided with a diameter substantially mating with the inside diameter of annulus 17 to prevent wobble action of the fitting termination when the coupling assembly is formed. Furthermore, this construction places different forces on the retaining clip during application of inwardly applied forces to the conduit 11. Thus, upon inwardly applied forces to conduit 11 the first shoulder portion 24 applies forces against the retaining clip and the wall 12 of the preexisting part rather than just shear forces to the legs of clip 31 in the construction where the diameter of the first shoulder 24 is the same as the diameter of the cylindrical surface 21.

Referring now to FIGURE 4 there is shown an alternative embodiment of the present invention where the plate 16' is in the form of an elongate rectangular member and is provided with a plurality of apertures 17' for receiving a plurality of fitting terminations B'. In this case the retaining clip 31' takes the form of a plate provided with a plurality of appertures 32' with plate aperture 17' to receive the ends of fitting terminations B'. The apertures 32' are provided with reduced diameter portions 33' on corresponding sides thereof with the diameter of portions 33' corresponding to the diameter of the bottom of the second annular groove 23' on the fitting termination B'. The exterior end of the clip 31' is provided with a bent or canted portion 35 for ease of insertion and removal of the clip 31' from the channel 19' of the plate 16'.

Referring now to FIG. 5 there is illustrated another embodiment of the present invention wherein the retaining clip 41 is formed of a punch press part for cooperation with an annulus type of plate 16 as shown in FIGS. 2 and 3. This retaining clip 41 includes a body 42 centrally cut out to leave longitudinally extending side members 43 and 44 which are bent out of the plane of the end portions 45 and 46. The cutout portion of the clip 41 leaves an engaging portion 47 projecting from end of portion 45 with portion 47 bifurcated to define legs 48 and 49 which have arcuate cutout portions there between. The arcuate cutout portions include a reduced diameter portion 51 corresponding to the diameter of the bottom of the second annular groove of the fitting termination. The leg portions 51 of the clip are positioned in the same plane as the end portions 45 and 46 thereof spaced from the plane of the side members 43 and 44. At the end of the clip opposite the leg portion extension 51 a stop 52 is formed extending from end portion 46.

The retainer clip 41 cooperates with an annular plate 16 as shown in FIGS. 2 and 3 with the side members 44 positioned above the stepped shoulders 18 thereof and the leg extensions 51 fitting in channel 19 for engagement with the second annular groove of the fitting termination. The clip 41 is designed to be retained on the annular plate 16 and moved in opposite directions to lock and unlock the fitting termination from connection with the wall 12.

Although the foregoing invention has been described in some detail by way of illustration and example for purposes of clarity and understanding, it is understood that certain modifications can be practiced within the spirit of the invention.

What is claimed is:

1. A coupling assembly for fluids comprising:
   a coupling member having a smooth bore therein;
   a fitting termination having a cylindrical surface on one end thereof for insertion into said bore, the cylindrical surface of said fitting termination having first and second annular grooves spaced apart axially of said cylindrical surface with said first groove closest the free end of said termination, first and second shoulders spaced axially of said fitting termination on the side of said second groove opposite said first groove and respectively increasing in diameter in a direction away from said second groove;
   sealing means in said first groove for providing a seal between said fitting termination and said bore;
   means defining a cylindrical surface portion connected to said coupling member coaxial iwth said bore and having a diameter greater than the diameter of said bore; means defining a channel between said cylindrical surface portion and said bore intersecting the axes thereof;
   removable retaining means cooperatively associated with said channel and said second groove for securely retaining said fitting termination in said bore; said first shoulder at the edge of said second groove having a diameter greater than the diameter of said termination cylindrical surface but less than the diameter of said cylindrical surface portion for slidably fitting with said cylindrical surface portion.

2. A coupling assembly comprising a housing having a hole punched therein and defining a smooth cylindrical bore extending from the obverse surface past the reverse surface thereof;
   a plate member having an aperture therein and a pair of shoulders projecting therefrom at equal distances from said aperture and in the same direction out of the plane of the portion of said plate defining said aperture thereby to define a channel between said shoulders;
   means securing said plate member to said housing with said channel extending between said aperture defining portion and said bore;
   a fitting termination having a smooth cylindrical surface on one end thereof dimensioned to slidably fit within said bore and having first and second annular grooves therein spaced apart axially thereof with the first groove nearest the free end of said termination and a shoulder portion adjacent said cylindrical surface remote from the free end of said fitting termination and having a diameter greater than the diameter of said aperture;
   sealing means in said first groove for providing a seal between said fiting termination and said bore and a removable retaining member slidable within said channel and at least a portion of said second groove when said shoulder portion abuts said plate member for locking the fitting termination in place in said bore.

3. The coupling assembly in accordance with claim 2 wherein the diameter of the aperture in said plate is greater than the diameter of said bore and including a second shoulder between said first shoulder and said second groove, said second shoulder having a diameter greater than the diameter of said cylindrical surface but less than the diameter of said plate aperture for slidably fitting within said aperture.

4. The coupling assembly in accordance with claim 2 wherein said plate is formed from an annulus having a pair of shoulders projecting at equal radial distances on a diameter of the annulus in the same direction out of the plane of the annulus whereby the channel is defined between said stepped shoulders.

5. The coupling assembly in accordance with claim 4 wherein said clip member is a partially punched out plate having an opposed pair of sides positioned in one plane to ride above said plate shoulders on one surface of said plate and a U-shaped portion projecting from an end of said clip member slidably insertable within said channel on the other surface of said plate.

References Cited

UNITED STATES PATENTS

| | | | |
|---|---|---|---|
| 2,278,708 | 4/1942 | Miller | 85—8.8 |
| 2,420,060 | 5/1947 | Adams | 85—8.8 |
| 2,535,016 | 12/1950 | Launder | 285—305 X |
| 2,668,724 | 2/1954 | Grodson. | |
| 2,672,924 | 3/1954 | Anthes | 285—305 X |
| 2,716,434 | 8/1955 | Crowther. | |
| 2,907,590 | 10/1959 | Oswald | 285—281 |

DAVID J. WILLIAMOWSKY, Primary Examiner

W. L. SHEDD, Assistant Examiner

U.S. Cl. X.R.

285—281, 305, 374